(12) United States Patent
Vijayasankar et al.

(10) Patent No.: US 9,001,844 B2
(45) Date of Patent: Apr. 7, 2015

(54) OVERLAPPING PRIORITY CONTENTION WINDOWS FOR G3 POWER LINE COMMUNICATIONS NETWORKS

(71) Applicant: Texas Instruments Incorporated, Dallas, TX (US)

(72) Inventors: Kumaran Vijayasankar, Dallas, TX (US); Ramanuja Vedantham, Allen, TX (US); Tarkesh Pande, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 77 days.

(21) Appl. No.: 13/848,056

(22) Filed: Mar. 20, 2013

(65) Prior Publication Data
US 2013/0279515 A1    Oct. 24, 2013

Related U.S. Application Data (60) Provisional application No. 61/616,518, filed on Mar. 28, 2012.

(51) Int. Cl.
| | |
|---|---|
| *H04L 12/413* | (2006.01) |
| *H04J 3/02* | (2006.01) |
| *H04L 12/927* | (2013.01) |
| *H04L 12/40* | (2006.01) |
| *H04B 3/54* | (2006.01) |
| *H04L 12/28* | (2006.01) |

(52) U.S. Cl.
CPC ........ *H04L 47/805* (2013.01); *H04L 12/40156* (2013.01); *H04L 12/413* (2013.01); *H04B 3/542* (2013.01); *H04L 2012/2843* (2013.01); *H04B 2203/5433* (2013.01)

(58) Field of Classification Search
None
See application file for complete search history.

(56) References Cited

U.S. PATENT DOCUMENTS

| | | | |
|---|---|---|---|
| 2002/0085582 | A1* | 7/2002 | Kim ............................ 370/445 |
| 2003/0103521 | A1 | 6/2003 | Raphaeli et al. |
| 2004/0004973 | A1* | 1/2004 | Lee ............................ 370/445 |
| 2009/0122807 | A1 | 5/2009 | Yoshizawa et al. |
| 2009/0310620 | A1 | 12/2009 | Yoshizawa et al. |
| 2010/0111099 | A1 | 5/2010 | Yonge et al. |
| 2012/0120796 | A1* | 5/2012 | Chu et al. ..................... 370/230 |

FOREIGN PATENT DOCUMENTS

KR    1020030016811 A    3/2003

* cited by examiner

*Primary Examiner* — Hong Cho
(74) *Attorney, Agent, or Firm* — Steven A. Shaw; Frank D. Cimino (57) ABSTRACT

Embodiments of methods and systems for overlapping priority contention windows in G3-PLC networks are presented. In one embodiment, a Normal Priority Contention Window (NPCW) is allowed to overlap with a High Priority Contention Window (HPCW). The minimum contention window for the normal priority frames (i.e., NPCW) is equal to or longer than the contention window for high priority frames (i.e., HPCW). By making the NPCW longer than the HPCW, the high priority frames will have a better chance than normal priority frames to get access to the channel on transmission reattempts.

20 Claims, 4 Drawing Sheets

OVERLAPPING PRIORITY CONTENTION WINDOWS FOR G3 POWER LINE COMMUNICATIONS NETWORKS

CROSS-REFERENCE TO RELATED APPLICATIONS

This application claims the benefit of the filing date of U.S. Provisional Patent Application No. 61/616,518, which is titled "G3 Overlapping Priority Contention Window" and was filed on Mar. 28, 2012, the disclosure of which is hereby incorporated by reference herein in its entirety.

BACKGROUND

Power line communications (PLC) include systems for communicating data over the same medium that is also used to transmit electric power to residences, buildings, and other premises, such as wires, power lines, or other conductors. In its simplest terms, PLC modulates communication signals over existing power lines. This enables devices to be networked without introducing any new wires or cables. This capability is extremely attractive across a diverse range of applications that can leverage greater intelligence and efficiency through networking. PLC applications include utility meters, home area networks, and appliance and lighting control.

PLC is a generic term for any technology that uses power lines as a communications channel. Various PLC standardization efforts are currently in work around the world. The different standards focus on different performance factors and issues relating to particular applications and operating environments. One of the most well-known PLC standards is G3-PLC, which has been approved by the International Telecommunication Union (ITU).

Using PLC to communicate with utility meters enables applications such as Automated Meter Reading (AMR) and Automated Meter Infrastructure (AMI) communications without the need to install additional wires. Consumers may also use PLC to connect home electric meters to an energy monitoring device or in-home display monitor their energy consumption and to leverage lower-cost electric pricing based on time-of-day demand.

As the home area network expands to include controlling home appliances for more efficient consumption of energy, OEMs may use PLC to link these devices and the home network. PLC may also support home and industrial automation by integrating intelligence into a wide variety of lighting products to enable functionality such as remote control of lighting, automated activation and deactivation of lights, monitoring of usage to accurately calculate energy costs, and connectivity to the grid.

The manner in which PLC systems are implemented depends upon local regulations, characteristics of local power grids, etc. The frequency band available for PLC users depends upon the location of the system. In Europe, PLC bands are defined by the CENELEC (European Committee for Electrotechnical Standardization). The CENELEC-A band (3 kHz-95 kHz) is exclusively for energy providers. The CENELEC-B, C, D bands are open for end user applications, which may include PLC users. Typically, PLC systems operate between 35-90 kHz in the CENELEC A band using 36 tones spaced 1.5675 kHz apart. In the United States, the FCC has conducted emissions requirements that start at 535 kHz and therefore the PLC systems have an FCC band defined from 154-487.5 kHz using 72 tones spaced at 4.6875 kHz apart. In other parts of the world different frequency bands are used, such as the Association of Radio Industries and Businesses (ARIB)-defined band in Japan, which operates at 10-450 kHz, and the Electric Power Research Institute (EPRI)-defined bands in China, which operates at 3-90 kHz.

To process different priority levels, G3-PLC allows for the use of a High Priority Contention Window (HPCW) where only the nodes that have a high priority packet can contend and transmit the frame. However, when there are no nodes in the network that have a high priority frame, the other nodes still have to wait for the entire HPCW window before transmitting any frames. This is a waste of network resources. This delay for the HPCW window will affect the achievable throughput because a node with high priority frames may not occur for a significant amount of time in the network. Also, the existing G3-PLC mechanism only ensures collision avoidance with neighboring nodes that can sense the channel but not with hidden nodes.

SUMMARY OF THE INVENTION

Embodiments of methods and systems for overlapping priority contention windows in G3-PLC networks are presented. In one embodiment, a Normal Priority Contention Window (NPCW) is allowed to overlap with the HPCW. The minimum contention window for the normal priority frames (i.e., NPCW) is equal to or longer than the contention window for high priority frames (i.e., HPCW). By making the NPCW longer than the HPCW, the high priority frames will have a better chance to get access to the channel.

This overlap of HPCW and NPCW will have only a small impact on the performance of the high priority frames. The window size for collision of nodes that intend to transmit normal priority frames is increased (e.g., doubled if the HPCW and NPCW are initially the same length. However, the window size for high priority frames is kept equal to the original HPCW. During a retransmission attempt, the backoff period for normal priority frames will push the normal priority frames out of the HPCW, but high priority frames will continue to attempt transmission in the HPCW. Hence, the high priority frames get an increased chance for a successful transmission during a retransmission attempt.

The proposed solution helps improve network throughput without significantly affecting the ability of the network to provide priority. Additionally, allowing overlapping NPCW and HPCW improves network throughput during periods when there are no high priority frames, which are significantly long periods in realistic traffic conditions.

BRIEF DESCRIPTION OF THE DRAWINGS

Having thus described the invention in general terms, reference will now be made to the accompanying drawings, wherein:

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The G3-PLC standard requires separate contention windows for high priority frames and normal priority frames. Embodiments of the present invention are directed modifying the contention window for normal priority frames (NPCW) to overlap the contention window for high priority frames (HPCW). This allows normal priority frames to access the channel quicker when there are no high priority frames and, therefore, improves overall system throughput by reducing normal priority frames. An example of such a system is described below in FIGS. 7-8. FIGS. 1-6 describe the G3-PLC systems and methods generally.

Figure 1:
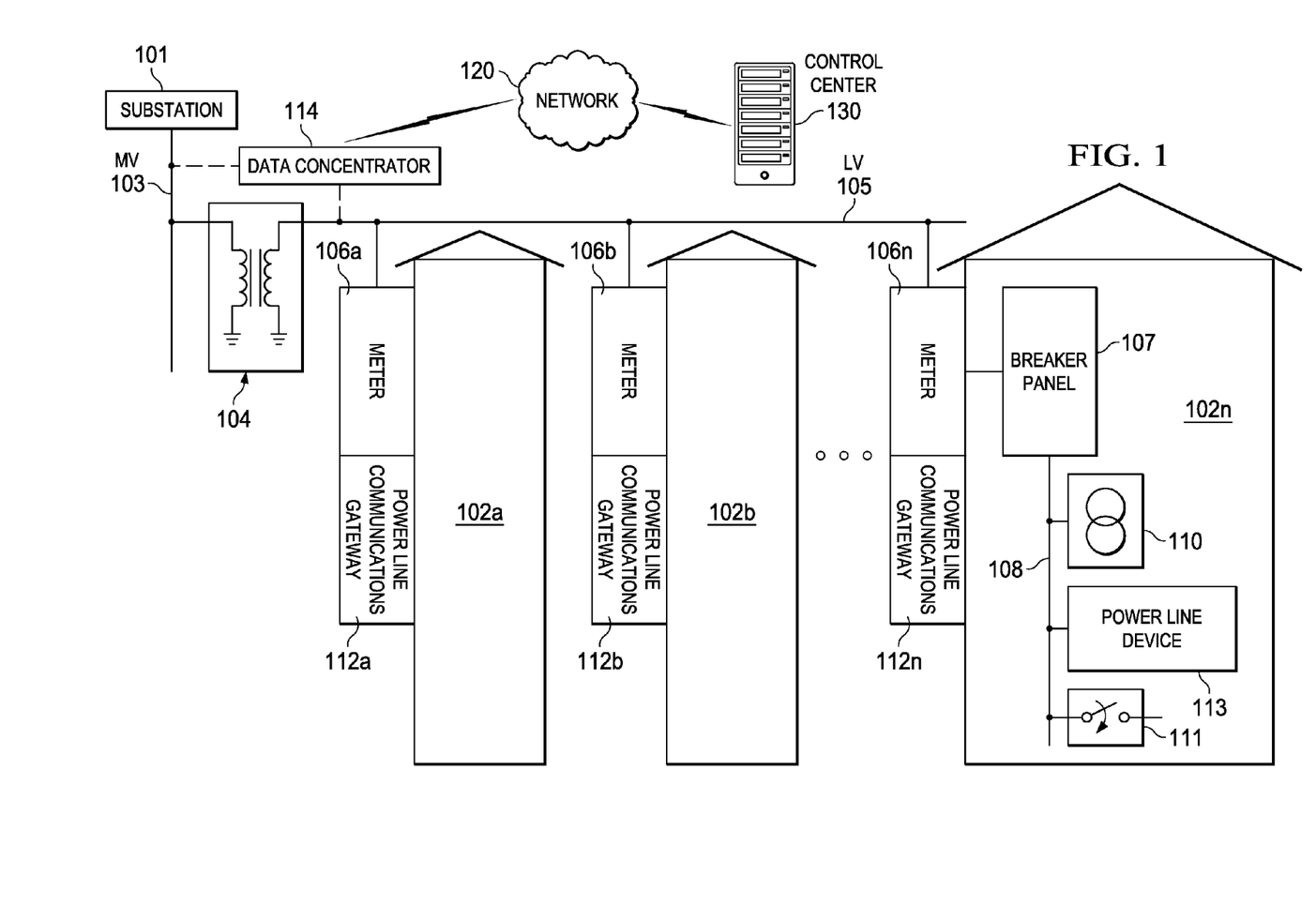
FIG. 1 is a diagram of a PLC system according to some embodiments.

FIG. 1 illustrates a power line communication system having overlapping priority contention windows in G3-PLC networks according to some embodiments. Medium voltage (MV) power lines 103 from subnode 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. Although referred to as "residences," premises 102a-n may include any type of building, facility, electric vehicle charging node, or other location where electric power is received and/or consumed. A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use a carrier signal having a frequency different from that of the power signal. The carrier signal may be modulated by the data, for example, using an OFDM technology or the like described, for example, G3-PL standard.

PLC modems or gateways 112a-n at residences 102a-n use the MV/LV power grid to carry data signals to and from PLC data concentrator or router 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more PLC data concentrators or routers 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

Figure 2:
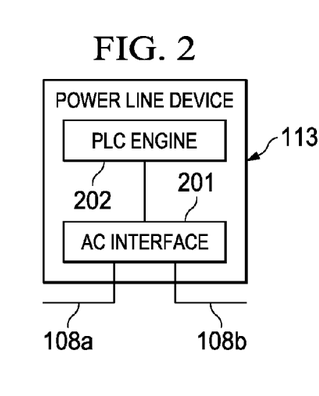
FIG. 2 is a block diagram of a PLC device or modem according to some embodiments.

FIG. 2 is a block diagram of PLC device 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

Figure 3:
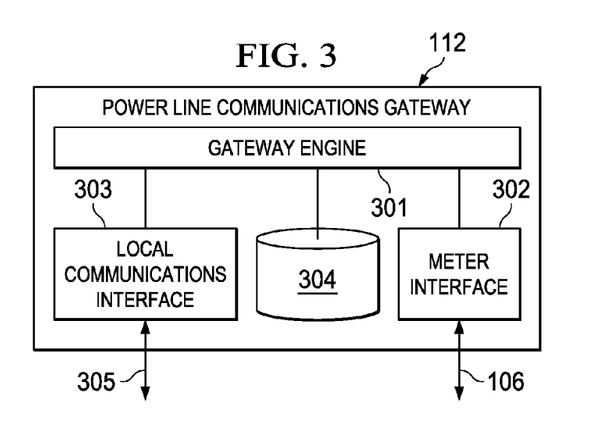
FIG. 3 is a block diagram of a PLC gateway according to some embodiments.

FIG. 3 is a block diagram of PLC gateway 112 according to some embodiments. As illustrated in this example, gateway engine 301 is coupled to meter interface 302, local communication interface 304, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZigBee, Bluetooth, Wi-Fi, Wi-Max, Ethernet, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 305 in assigning, allocating, or otherwise managing frequency bands assigned to its various PLC devices.

Figure 4:
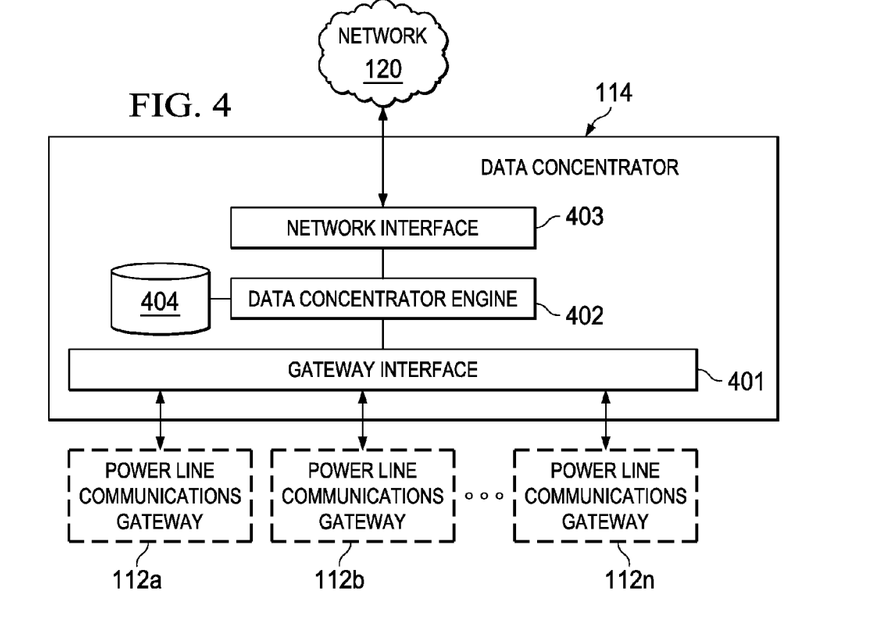
FIG. 4 is a block diagram of a PLC data concentrator according to some embodiments.

FIG. 4 is a block diagram of PLC data concentrator or router 114 according to some embodiments. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (now shown) configured to communicate directly with meters 116a-n, PLC devices 113, and/or other appliances. Further, if PLC gateways 112a-n are absent, frequency usage database 404 may be configured to store records similar to those described above with respect to database 304.

Figure 5:
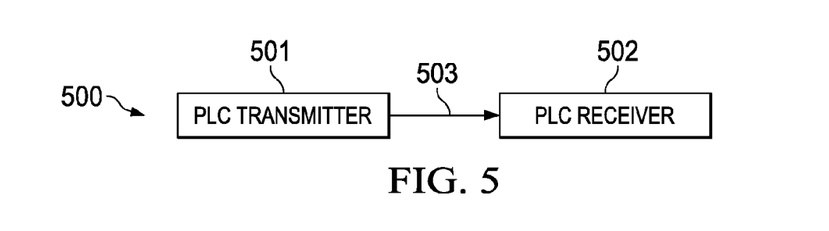
FIG. 5 is a schematic block diagram illustrating one embodiment of a system configured for point-to-point PLC.

FIG. 5 is a schematic block diagram illustrating one embodiment of a system 500 configured for point-to-point PLC. The system 500 may include a PLC transmitter 501 and a PLC receiver 502. For example, a PLC gateway 112 may be configured as the PLC transmitter 501 and a PLC device 113 may be configured as the PLC receiver 502. Alternatively, the PLC device 113 may be configured as the PLC transmitter 501 and the PLC gateway 112 may be configured as the PLC receiver 502. In still a further embodiment, the data concentrator 114 may be configured as either the PLC transmitter 501 or the PLC receiver 502 and configured in combination with a PLC gateway 112 or a PLC device 113 in a point-to-point system 500. In still a further embodiment, a plurality of PLC devices 113 may be configured to communicate directly in a point-to-point PLC system 500 as described in FIG. 5. Additionally, the subnode 101 may be configured in a point-to-point system 500 as described above. On of ordinary skill in the art will recognize a variety of suitable configurations for the point-to-point PLC system 500 described in FIG. 5.

Figure 6:
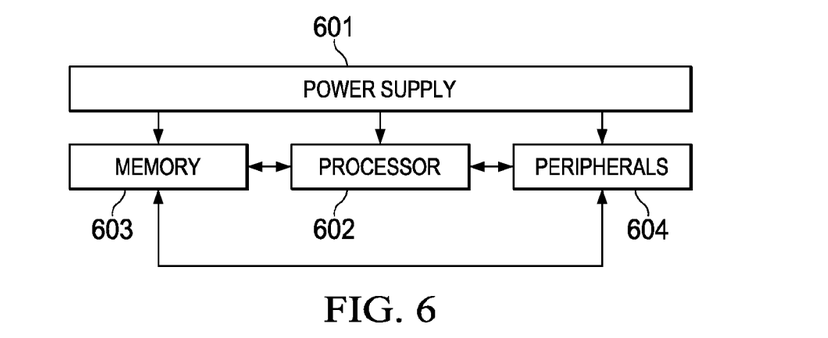
FIG. 6 is a block diagram of an integrated circuit according to some embodiments.

FIG. 6 is a block diagram of a circuit for implementing overlapping priority contention windows in G3-PLC networks according to some embodiments. In some cases, one or more of the devices and/or apparatuses shown in FIGS. 1-5 may be implemented as shown in FIG. 6. In some embodiments, processor 602 may be a digital signal processor (DSP), an application specific integrated circuit (ASIC), a system-on-chip (SoC) circuit, a field-programmable gate array (FPGA), a microprocessor, a microcontroller, or the like. Processor 602 is coupled to one or more peripherals 604 and external memory 603. In some cases, external memory 603 may be used to store and/or maintain databases 304 and/or 404 shown in FIGS. 3 and 4. Further, processor 602 may include a driver for communicating signals to external memory 603 and another driver for communicating signals to peripherals 604. Power supply 601 provides supply voltages to processor 602 as well as one or more supply voltages to memory 603 and/or peripherals 604. In some embodiments, more than one instance of processor 602 may be included (and more than one external memory 603 may be included as well).

Peripherals 604 may include any desired circuitry, depending on the type of PLC system. For example, in an embodiment, peripherals 604 may implement local communication interface 303 and include devices for various types of wireless communication, such as Wi-Fi, ZigBee, Bluetooth, cellular, global positioning system, etc. Peripherals 604 may also include additional storage, including RAM storage, solid-state storage, or disk storage. In some cases, peripherals 604 may include user interface devices such as a display screen, including touch display screens or multi-touch display screens, keyboard or other input devices, microphones, speakers, etc.

External memory 603 may include any type of memory. For example, external memory 603 may include SRAM, non-volatile RAM (NVRAM, such as "flash" memory), and/or dynamic RAM (DRAM) such as synchronous DRAM (SDRAM), double data rate (DDR, DDR2, DDR3, etc.) SDRAM, DRAM, etc. External memory 603 may include one or more memory modules to which the memory devices are mounted, such as single inline memory modules (SIMMs), dual inline memory modules (DIMMs), etc.

Figure 7:
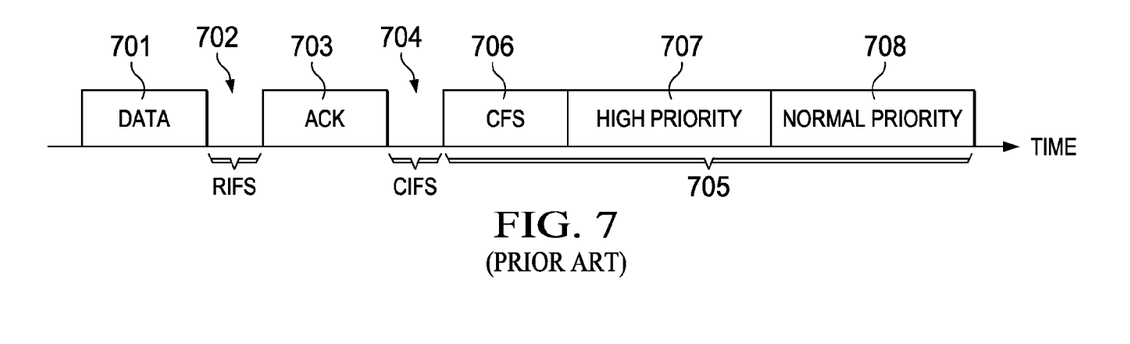
FIG. 7 illustrates channel access in a G3-PLC network using an existing standard.

FIG. 7 illustrates channel access in a G3-PLC network using an existing standard. The channel access is accomplished by using carrier sense multiple access with collision avoidance (CSMA/CA) with a random back-off time. A random back-off spreads out the times when nodes attempt to transmit, thereby reducing the probability of collision between two nodes. Each time a device wishes to transmit data frames, it shall wait for a random period (i.e. random back-off). If the channel is idle following the random back-off, the device transmits its data. If the channel is busy following the random back-off, the device waits for another random period before trying to access the channel again.

A collision occurs or is inferred in the following circumstances: when a transmitting node receives something other than an Acknowledgement (ACK) or Negative Acknowledgement (NACK) response when a response is expected, or when there is an absence of any response to a transmission when a response is expected.

In FIG. 7, a previous transmission 701 ends and is followed by a response inter-frame space (RIFS) 702. The RIFS 702 interval is between the end of transmission 701 and the start of an associated response, such as Acknowledgement 703. A contention inter-frame space (CIFS) 704 occurs after the end of transmission exchange 701/703. The inter-frame space accounts for propagation times and processing times associated with completing the previous transmission and response. Following the CIFS 704, a contention state 705 begins for new transmissions.

Contention state 705 begins with a contention free slot (CFS) 706 that may be used for the transmission of subsequent segments of a previously transmitted Media Access Control (MAC) packet without requiring the back-off procedure. CFS 706 prevents possible interruptions from other nodes and simplifies the MAC packet reassembly procedure for the received segments. The first segment is sent using a normal or high priority contention window, and the remaining segments are sent using CFS 706.

Following CFS 706, in existing G3-PLC networks, nodes with high priority frames compete for channels during the high priority contention window (HPCW) 707. Then, nodes with normal priority frames compete for normal priority contention window (NPCW) 708. Since HPCW 707 is located before NPCW 708, nodes with high priority frames will get access to the channel before nodes with normal priority frames.

In one embodiment, the duration of HPCW 707 and NPCW 708 are calculated as follows.

$$\text{CFS time} = a\text{SlotTime}; \quad \text{(Eq. 1)}$$

$$\text{HPCW time} = \text{macHighPriorityWindowSize} \times a\text{SlotTime; and} \quad \text{(Eq. 2)}$$

$$\text{NPCW time} = (2^{maxBE} \times a\text{SlotTime}). \quad \text{(Eq. 3)}$$

where aSlotTime is the duration of the contention slot time, macHighPriorityWindowSize is the high priority contention window size in number of slots, and maxBE is the maximum value of the back-off exponent.

The CSMA-CA algorithm spreads out the time over which nodes attempt to transmit using a truncated binary exponential back-off mechanism to reduce the probability of collision. The algorithm is implemented using units of time called back-off periods, where one back-off period is equal to a predetermined number of symbols. Each device maintains two variables for each transmission attempt: NB and BE. NB is the number of times the CSMA-CA algorithm has been used as back-off while attempting the current transmission. NB is initialized to 0 before each new transmission attempt. BE is the back-off exponent, which is related to how many back-off periods a device shall wait before attempting to assess a channel. BE is initialized to a minimum value, minBE.

The MAC sublayer delays for a random number of complete back-off periods in the range 0 to ($2^{BE}-1$). The random number of back-off periods is calculated as follows:

$$\text{Back-off Time} = \text{Random}(2^{BE}-1) \times a\text{SlotTime} \quad \text{(Eq. 4)}$$

At the end of the back-off period, the MAC sublayer requests that the PHY perform a physical carrier sense. If the channel is assessed to be busy, then the MAC sublayer increments both NB and BE by one, ensuring that BE shall be no more than maxBE. For high priority packets, maxBE is equal to minBE.

If the value of NB is less than or equal to a maximum number of CSMA backoffs, then the CSMA-CA algorithm delays for the new back-off time and performs the physical carrier sense again. If the value of NB is greater than a maximum number of CSMA backoffs, then the CSMA-CA algorithm identifies a channel access failure status.

When the physical carrier sense determines that the channel is idle following, the MAC sublayer immediately begins transmission of the frame.

Accordingly, in current G3-PLC systems, nodes having normal priority frames must wait until the HPCW 707 has completed and then compete with other normal priority nodes for channel access using CSMA/CA. When no nodes have high priority frames, the normal priority nodes must still wait out the HPCW period, which lowers overall network throughput and efficiency.

Figure 8:
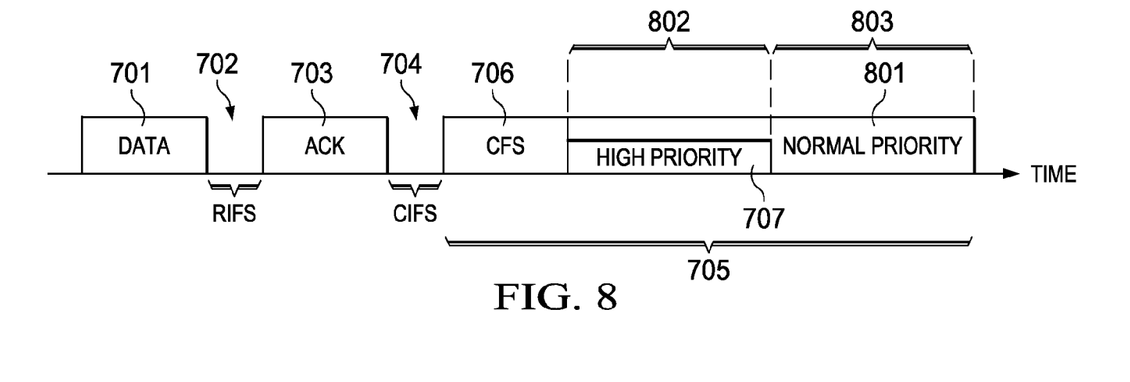
FIG. 8 illustrates channel access in a G3-PLC network with a modified normal priority contention window according to one embodiment.

FIG. 8 illustrates channel access in a G3-PLC network with a modified normal priority contention window according to one embodiment. The contention window 801 for normal priority nodes has been expanded so that it begins when CFS 706 ends. The overall contention state 705 remains the same, but NPCW 801 now overlaps HPCW 707 for the interval 802, which corresponds to the duration of the HPCW 707. During interval 802, both high priority nodes and normal priority nodes can access the channel.

The duration of NPCW 801 may be equal or higher than the duration of HPCW 707. FIG. 8 illustrates an embodiment in which NPCW 801 is longer than HPCW 707; however, both NPCW 801 and HPCW 707 may be the same duration 802 in other embodiments. If NPCW 801 is longer than HPCW 707, then the high priority frames will have a better chance to access the channel.

The back-off times for both high priority frames and normal priority frames are calculated using Equation 4 above. However, for high priority frames, the back-off exponent, $BE_{HP}$, is limited to a minimum value, minBE, but the back-off exponent, $BE_{NP}$, may increase to the maximum value, maxBE. In one embodiment, minBE can be selected so that the back-off time for high priority frames remains within HPCW interval 707. On the other hand, because it can go up to maxBE, the back-off time for the normal priority frames may increase to region 803, which is outside of HPCW 707 but still within NPCW 801.

If collisions occur between a high priority frame and a normal priority frame during HPCW interval 707, the back-off time for the normal priority frame will eventually increase and move the normal priority channel access attempts into region 803. This will eliminate collisions with high priority frames in region 802.

The modification illustrated in FIG. 8 will have only a small impact on the performance of the high priority frames. On collision, the contention window size for nodes that intend to transmit normal priority frames is doubled, but the contention window size for nodes with high priority frames stays equal to HPCW 707. Hence, the high priority frames have an increased chance for a successful transmission during a retransmission attempt.

It will be understood that in various embodiments, the modules shown in FIGS. 1-6 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the modules shown in FIGS. 1-6 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

What is claimed is:

1. A method for accessing a channel used by high priority frames and normal priority frames, comprising:
   performing, by a power line communication (PLC) transmitter device,
      generating a normal priority data packet;
      calculating a back-off time using a back-off exponent value;
      starting at the beginning of a high priority contention window, delay for the back-off time; and
      after the back-off time delay, attempt to access the channel during the high priority contention window.

2. The method of claim 1, further comprising:
   determining that the channel is busy;
   incrementing the back-off exponent value; and
   calculating an updated back-off time using the incremented back-off exponent value;
   starting at the beginning of the high priority contention window, delay for the incremented back-off time; and
   after the incremented back-off time delay, attempt to access the channel during the high priority contention window.

3. The method of claim 1, further comprising: determining that the channel is busy; incrementing the initial back-off exponent value only for normal priority frames but not incrementing the initial back-off exponent value for high priority frames; and calculating an updated back-off time using the incremented back-off exponent value; starting at the beginning of the high priority contention window, delay for the incremented back-off time; and after the incremented back-off time delay, attempt to access the channel.

4. The method of claim 1, further comprising: determining that the channel is idle; and transmitting the normal priority data packet during the high priority contention window.

5. The method of claim 2, further comprising:
   determining that the channel is idle after the incremented back-off time; and
   transmitting the normal priority data packet during the high priority contention window.

6. The method of claim 1, wherein the high priority contention window and a normal priority contention window for the PLC transmitter device begin at the same time, and wherein the high priority contention window and the minimum value of normal priority contention window are the same duration.

7. The method of claim 1, wherein the high priority contention window and a normal priority contention window for the PLC transmitter device begin at the same time, and wherein the normal priority contention window has a longer duration than the high priority contention window.

8. A method for accessing a channel used by high priority frames and normal priority frames, comprising:
   performing, by a power line communication (PLC) transmitter device,
      transmitting a normal priority data packet during a high priority contention window;
      detecting a collision for the normal priority data packet;
      calculating a back-off time for the normal priority data packet;
      starting at the beginning of the high priority contention window, delay for the back-off time; and
      after the back-off time delay, attempt to access the channel.

9. The method of claim 8, wherein the attempt to access the channel after the back-off time delay occurs during the high priority contention window.

10. The method of claim 8, wherein the attempt to access the channel after the back-off time delay occurs during a normal priority contention window.

11. The method of claim 8, further comprising:
    determining that the channel is idle after the back-off time delay; and
    transmitting the normal priority data packet during the high priority contention window.

12. The method of claim 8, wherein the high priority contention window and a normal priority contention window for the PLC transmitter device begin at the same time, and wherein the high priority contention window and the normal priority contention window are the same duration.

13. The method of claim 8, wherein the high priority contention window and a normal priority contention window for the PLC transmitter device begin at the same time, and wherein the normal priority contention window has a longer duration than the high priority contention window.

14. A system, comprising:
    a power line communication (PLC) transmitter device coupled to a PLC network; the PLC transmitter device configured to:
       perform a physical channel sense operation to detect an idle channel on the PLC network; and
       transmit a normal priority data packet on the channel during a high priority contention window.

15. The system of claim 14, the PLC transmitter device further configured to:
    detect a collision for the normal priority data packet;
    calculate a back-off time for the normal priority data packet;
    starting at the beginning of the high priority contention window, delay for the back-off time; and
    after the back-off time delay, attempt to access the channel.

16. The system of claim 15, wherein the attempt to access the channel after the back-off time delay occurs during the high priority contention window.

17. The system of claim 15, wherein the attempt to access the channel after the back-off time delay occurs during a normal priority contention window.

18. The system of claim 15, the PLC transmitter device further configured to:
   determine that the channel is idle after the back-off time delay; and
   transmit the normal priority data packet during the high priority contention window.

19. The system of claim 14, wherein the high priority contention window and a normal priority contention window for the PLC transmitter device begin at the same time, and wherein the high priority contention window and the normal priority contention window are the same duration.

20. The system of claim 14, wherein the high priority contention window and a normal priority contention window for the PLC transmitter device begin at the same time, and wherein the normal priority contention window has a longer duration than the high priority contention window.

* * * * *